United States Patent Office 3,734,913
Patented May 22, 1973

3,734,913
THIAMINE DERIVATIVES AND
PRODUCTION THEREOF
Akira Takamizawa, Ibaraki, and Kentaro Hirai, Kyoto, Japan, assignors to Shionogi & Co. Ltd., Higashi-ku, Osaka Prefecture, Japan
No Drawing. Filed Oct. 12, 1970, Ser. No. 80,163
Claims priority, application Japan, Oct. 24, 1969, 44/85,578; Dec. 18, 1969, 44/101,829
Int. Cl. C07d 99/12
U.S. Cl. 260—256.5 B          1 Claim

ABSTRACT OF THE DISCLOSURE

Thiazolium salts represented by the formula:

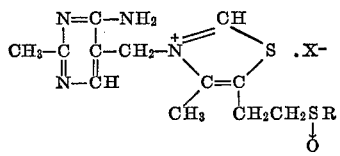

wherein R represents a lower alkyl group, an aryl group, or an ar(lower)alkyl group, and X represents an acid residue or its acid addition salt, being useful as poultry anti-coccidial agents, are prepared by two routes.

---

The present invention relates to thiamine derivatives and the production thereof. More particularly, this invention relates to a novel type of thiazolium salt, and its acid addition salt, having poultry anti-coccidial activity, and their production. The said thiazolium salt is represented by the formula:

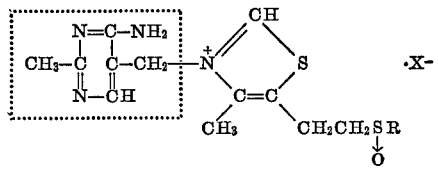

wherein R represents a lower alkyl (e.g. isopropyl, methyl, ethyl), aryl (e.g. phenyl, tolyl) or ar(lower)alkyl (e.g. benzyl, phenethyl) group and X represents an acid residue (e.g. an acid residue of an inorganic acid, including hydrochloric acid, sulfuric acid, nitric acid, thiocyanic acid and phosphoric acid; or a residue of an organic acid, including succinic acid, naphthalenedisulfonic acid, benzoic acid, benzenesulfonic acid, and acetic acid). (The partial structure encompassed by the dotted line in the above formula will be hereinafter abbreviated as "Pym.")

Accordingly, it is a basic object of the present invention to embody the thiazolium salt (I) and its acid addition salt. Another object of this invention is to embody the thiazolium salt (I) and its acid addition salt as being useful as poultry anti-coccidial agents. A further object of the invention is to embody a process for preparing the thiazolium salt (I) and its acid addition salt. These and other objects will be apparent to those conversant with the art to which the present invention pertains from the following description.

The said thiazolium salt (I) can be independently prepared by the following two routes:

Route A:

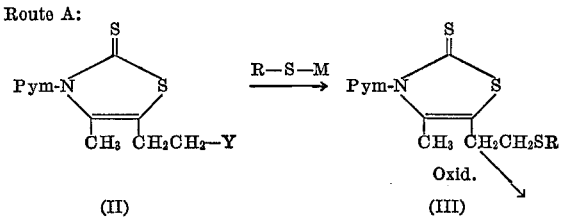

Route B:

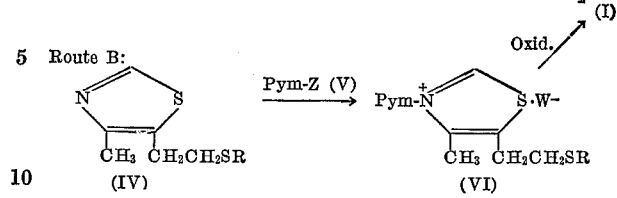

wherein Y and Z each represents a halogen atom (e.g. chlorine, bromine, iodine), M represents a hydrogen atom or an alkali metal atom (e.g. sodium, potassium, lithium) or an alkaline earth metal atom (e.g. calcium, barium), W represents an acid residue (e.g. a residue of an inorganic acid, including hydrochloric acid, sulfuric acid, nitric acid, thiocyanic acid and phosphoric acid; or a residue of an organic acid, including succinic acid, benzoic acid, benzenesulfonic acid, naphthalenesulfonic acid and acetic acid), and R is as defined above.

ROUTE A

The starting thioxothiaminyl halide (II) is prepared, for instance, by reacting N-(2-methyl-4-amino-5-pyrimidyl)methyl-dithiocarbamic acid with 3,5-dihalogeno-2-pentanone as shown below:

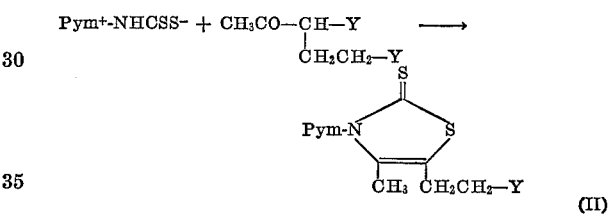

wherein Y represents a halogen atom. This route consists of two steps, and the first one is carried out by reacting the thioxothiaminyl halide (II) with a mercapto compound (including a mercaptan and a mercaptide). Examples of the mercapto compound are: (lower)alkyl-mercapto compound (e.g. ethyl mercaptan, isopropyl mercaptan, methyl mercaptan, ethyl sodium mercaptide, methyl potassium mercaptide, isopropyl magnesium mercaptide and methyl sodium mercaptide), arylmercapto compound (e.g. phenyl mercaptan, tolyl mercaptan, phenyl sodium mercaptide, tolyl potassium mercaptide) and ar(lower)alkylmercapto compound (e.g. benzyl mercaptan, phenethyl mercaptan, benzyl sodium mercaptide, phenethyl potassium mercaptide). When a mercaptan is used as the reagent, the reaction may be favorably effected in the presence of sufficient inorganic base to convert the mercaptan into the corresponding mercaptide. The reaction may be carried out in an inert solvent at room temperature or under cooling or mild heating, depending on the reaction requirement. Examples of the inert solvent are water, alcohols (e.g methanol, ethanol, ethylene glycol), ethers (e.g. ethyl ether, dioxane, diglyme, tetrahydrofuran), hydrocarbons (e.g. benzene, toluene, n-hexane), dimethylformamide, dimethylsulfoxide and their mixture. Examples of the inorganic base are alkali hydroxide (e.g. potassium hydroxide, sodium hydroxide), alkali carbonate (e.g. sodium carbonate, potassium carbonate), alkali bicarbonate (e.g. sodium bicarbonate, potassium bicarbonate) and hydroxides, carbonates, and bicarbonates of alkaline earth metal (e.g. magnesium, calcium, barium). Further, there may be optionally added organic bases (e.g. dimethylaniline, triethylamine, pyridine, piperazine, morpholine, piperidine) other than the said inorganic base. The reaction may proceed smoothly to give the intermediary sulfide (III).

The sulfide (III) is then subjected to oxidation to obtain the objective product (I). The reaction of this step involves an oxidative desulfurization of the thione group in combination with conversion of the thioether group into the corresponding sulfinyl group. This reaction may be carried out according to a method using an oxidizing agent (including hydrogen peroxide, bromine, potassium chlorate, manganese dioxide, potassium permanganate and nitric acid), or by using an electrolytic oxidation method. For example; hydrogen peroxide reacts exothermically with a solution of the sulfide (III) in water, organic acid, or dilute aqueous inorganic acid; a solution of bromine in glacial acetic acid is added to a solution of the compound (III) in dilute inorganic acid, the reaction occurring at room temperature; an aqueous solution of potassium chlorate is treated with a solution of the compound (III) in dilute hydrochloric acid under mild heating; an aqueous solution of potassium permanganate is added to a solution of the compound (III) in dilute sulfuric acid to oxidize it under cooling; and a solution of the compound (III) is oxidized in dilute nitric acid by heating at 50 to 60° C. In the case of adopting an electrolytic oxidation, the electric current is passed through a solution of the compound (III) in dilute sulfuric acid (electrolytic solution) via a platinum plate (cathode) and a platinum spiral line (anode) to cause the expected oxidation. In this oxidation step four oxygen-atom equivalents of oxidizing agent are theoretically required. These oxidations may be executed in a conventional manner. In this oxidation two kinds of by-product: the corresponding [2-(substituted)-thioethyl]thiazolium compound (hereinafter referred to as "thioethylthiazolium salt") and the corresponding [2-(substituted)-sulfonylethyl]thiazolium salt (hereinafter referred to as "Sulfonylethylthiazolium salt"), may be produced together with the main product, the sulfinylethylthiazolium salt (I). The production of these by-products can be controlled by suitable choice of oxidizing method, reaction condition (i.e. reaction time, reaction temperature), and amount of the oxidizing agent. For instance, about 4 mol equivalents of hydrogen peroxide can afford almost selectively the objective sulfinylethylthiazolium salt (I).

ROUTE B

The starting material, 4-methyl-5-[2-(substituted)-thioethyl]thiazole (IV), can be prepared, for instance, by treating 4-methyl-5-(2-hydroxyethyl)thiazole with thionyl chloride in pyridine to give 4-methyl-5-(2-chloroethyl)thiazole which is then treated with one of the substituted mercaptans.

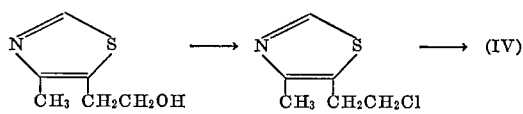

The other starting material, 2-methyl-4-amino-5-halogenomethylpyrimidine (V), 2-methyl-4-amino-5-bromomethylpyrimidine, for example, is prepared by reacting acetamidine with α-methoxymethylene-β-ethoxypropionitrile to give 2-methyl-4-amino-5-ethoxymethylpyrimidine which is then reacted with hydrobromic acid.

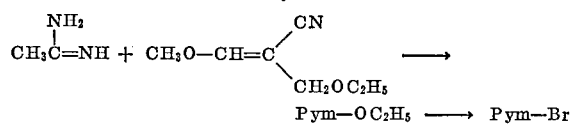

Pym—OC₂H₅ ⟶ Pym—Br

This route includes two successive steps, the first of which can be effected by treating the 2-methyl-4-amino-5-halogenomethylpyrimidine (V) with the 4-methyl-5-[2-(substituted)thioethyl]thiazole (IV). This reaction proceeds by heating these materials in an inert solvent for a short time. The inert solvent can be, for example, dimethylformamide, alcohols (e.g. methanol, ethanol, glycerin), ethers (e.g. ether, dioxane, tetrahydrofuran), esters (e.g. methyl acetate, ethyl acetate) hydrocarbons (e.g. benzene, toluene, hexane), or their mixture. Thus, there is obtained the condensate (VI) in a good yield. For convenience of separation, purification or pharmaceutical procedures, the acid residue of the product (VI) may be transformed into another acid residue, for instance, by treating the thiazolium bromide produced, with silver chloride to make the corresponding thiazolium chloride.

In the second step of this route for converting the thioethyl group of the above obtained thiazolium compound (VI) into the sulfinyl group, the compound (VI) is subjected to oxidation. This oxidation can be performed quite similarly to the second step of Route A, except that one oxygen-atom-equivalent of oxidizing agent is sufficient for this route instead of the four oxygen-atom-equivalents required in Route A. In this step the corresponding sulfonylethylthiazolium salt may be formed to some extent as a by-product; this can be separated from the objective compound (I) very easily. The production of the said sulfonylethyl compound can be controlled by appropriate choice of oxidation conditions adopted, i.e.; amount and nature of oxidizing agent, reaction temperature, and reaction period. Thus, the objective sulfinylethylthiazolium salt (I) can be obtained in a good yield in a form of a quaternary salt or its acid addition salt.

Thus obtained sulfinylethylthiazolium quaternary salt (I) may, when required, be converted into acid addition salts suitable for pharmaceutical use, having low toxicity and desirable stability. Such a conversion can be effected in a conventional manner such as treating the said quaternary salt (I) with an acid in an appropriate solvent. Examples of the pharmaceutically acceptable acid-addition salts are hydrochloride, hydrobromide, hydroiodide, sulfate, nitrate, phosphate, thiocyanate, oxalate, succinate, and naphthalenedisulfonate.

Thus obtained sulfinylethylthiazolium quaternary salt (I) or its acid addition salt is useful as a poultry anti-coccidial agent in prophylaxis and/or therapy. Poultry coccidiosis due to *Eimeria tenella* or *Eimeria necatrix* induces bleeding in the digestive organs, death and growth inhibition in poultry such as chicks, turkeys, or ducks. Compounds heretofore used as anti-coccidial agents include sulfa drugs, nitrofurans, quinolines, anti-thiamine agents, benzamides and antibiotic substances. These known anti-coccidial agents suffer from some drawbacks in their degree of the anti-coccidial activity, their toxicity to, or intolerance by the hosts, and the emergence of strains having drug resistance owing to misuse of the drugs over a long period. Such factors have gradually decreased the value of the known drugs. Advantages of the present invention consist in that the quaternary salt (I) or its acid-addition salt has low toxicity to host poultry, induction of drug resistance is difficult, and the said salt shows very powerful anti-coccidial activity for both prophylaxis and treatment of the disease.

For anti-coccidial poultry compositions, comprising the said quaternary salt (I) or its acid-addition salt, suitable formulations which may be used, include: powder, granules, solution, dispersion, premix, capsule, emulsion and tablets, singly or in combination with an appropriate carrier ordinarily used in this field. There can be combined ordinary additives including vehicles, disintegrating agents, lubricants and coating materials. In general, a suitable concentration of the quaternary salt (I) or its acid-addition salt for poultry feed is at least 0.003 weight percent. For prophylactic use, suitable concentration of the drug (I) is about 0.003 to about 0.06 weight percent, more favorably about 0.003 to about 0.02 weight percent, and for therapeutic purpose a suitable concentration is about 0.01 weight percent to about 0.16 weight percent. For instance, solution, suspension or emulsion may be used in combination with drinking water; capsules or tablets may be administered orally as they are. By carriers is meant a diluent substance to be ordinarily added into poultry feed and involves illustratively water, lactose, sucrose, talc, pectin, wheat powder, rice bran, wheat bran, corn powder, soy bean meat, crushed grain powder and the like. The present anti-coccidial compositions may be optionally used in combination with animal drugs including antibiotics, other known poultry anti-coccidial agents and anthelmintics.

The practical anti-coccidial effects of the poultry anti-coccidial agents of this invention are shown by the following experiment.

(A) TEST METHOD

Several groups of test animals, each group consisting of 10 White Leghorn chicks were orally infected with 50,000 sporulated oocysts of *Eimeria tenella* per chick. Test compounds were administered orally every day for 8 days after infection. On the 8th day, test animals were anatomized, and degrees of pathological change in the cecum were observed. During the period of administration of the test compound, the numbers of the hematochezia, ratios of survival, relative ratios of increased body weight, numbers of oocysts and degrees of pathological change in the cecum were determined.

(B) TEST COMPOUND

| Comp. No. | Compound name | Note |
|---|---|---|
| 1 | 3-(2-methyl-4-aminopyrimidin-5-ylmethyl)-4-methyl-5-(2-sulfoethyl)thiazolium chloride hydrate. | Control. |
| 2 | 3-(2-methyl-4-aminopyrimidin-5-ylmethyl)-4-methyl-5-(2-methylsulfinylethyl)-thiazolium chloride hydrochloride hydrate. | Subject matter of this invention. |

(C) RESULTS

The results of the test against *Cecum coccidiosis* in White Leghorn chicks are shown in Table 1.

TABLE I

| Section | | | | | | | Relative ratio [2] of increased | | |
|---|---|---|---|---|---|---|---|---|---|
| Compound No. | Conc. (percent) in feed | Number of hematochezia [1] | | | | | Ratio of survivals (percent) | body weight (percent) | Number of oocysts (O.P.G.) [3] | Degree of pathological change in cecum [4] |
| | | 4th day | 5th day | 6th day | 7th day | 8th day | | | | |
| 1 | 0.01 | 1 | >20 | >20 | 11 | 0 | 60 | 81 | 160×10⁴ | 40 |
| 2 | 0.04 | 0 | 0 | 0 | 0 | 0 | 100 | 98 | 0 | 0 |
| | 0.02 | 0 | 0 | 0 | 0 | 0 | 100 | 112 | 0 | 0 |
| | 0.01 | 0 | 0 | 0 | 0 | 0 | 100 | 101 | 0 | 5 |
| | 0.005 | 0 | 0 | 0 | 0 | 0 | 100 | 99 | 13×10⁴ | 29 |
| | 0.0025 | 0 | 2 | 13 | 2 | 0 | 100 | 93 | 192×10⁴ | 40 |
| Control | (a) | 7 | ∞ | >20 | >20 | 0 | 40 | 55 | 42×10⁴ | 40 |
| | (b) | 0 | 0 | 0 | 0 | 0 | 100 | 100 | 0 | 0 |

[1] Shows the count of hematochezia per 10 chicks, and ∞ shows that there were too many to count.
[2] Shows the ratio of the increased body weight of the chicks in treated groups or infected control group to that of chicks in uninfected control group.
[3] Shows the count of oocysts existing per gram of feces in the cecum of chicks abbreviated as O.P.G.
[4] Shows the degree of pathological change in cecum. Surviving chicks were anatomixed on the 8th day after infection, and degrees of pathological change in cecum were observed microscopically. Degrees of pathological change in cecum were classified into 5 orders, given scores from 0 to 4 (serious, 4; considerable, 3; moderate, 2; slight, 1; almost sound, 0). The total (0 to 40) of the scores was calculated for each group of ten chicks. This procedure follows the assay method of Merck & Co., Inc.

NOTE.—(a) = Infected case; (b) = Uninfected case.

Acute toxicity of the 2-methylsulfinylethylthiazolium salt (Compound No. 2) is shown in Table 2.

TABLE 2

| Route | Rat | | Mouse | | Chick |
|---|---|---|---|---|---|
| | Male | Female | Male | Female | Both sex |
| Per os | 10.0 | 10.0 | 7.4 | 8.8 | 10.3 |
| S.C. | 2.45 | 2.40 | 0.56 | 0.62 | 2.0 |
| I.V. | 0.37 | 0.36 | 0.16 | 0.19 | [1] 1.41 |

[1] I.P.

NOTE.—Figures represent LD₅₀ (g./kg.) values. Acute toxicity, in mouse, as an example, was obtained as follows: Test animals were groups of white albino mice weighing from 19 to 21 grams, each group consisting of 20 mice. Animals in each group were orally, subcutaneously or intravenously treated with varying amounts of the test compound and observed for 24 hours after the administration. The lethal dose 50 was calculated by graphic interpolation from two of the doses actually used, one of which killed less than half and the other more than half of the number of mice treated (Schleicher and Schull probability graph paper 298 1/2 was used for the graphic interpolation). Toxicities for other animals were obtained similarly.

Accordingly, as clearly shown in the above results on the prophylaxis and treatment for chick coccidiosis, the 2) methylsulfinylethyl-thiazolium salt (Compound No. 2) shows superior anti-coccidial activity to that of the analogous 2-sulfoethylthiazolium salt (Compound No. 1). The former is considerably active even in a concentration in feed of 0.0025% and still positively active in a concentration of 0.01%. Also, it has a very low toxicity.

Presently-preferred and practical embodiments of the present invention are illustratively shown in the following examples.

EXAMPLE 1

(a) To a cold solution of methyl mercaptan (about 7 g.) in a mixture of sodium hydroxide (0.5 g.) and dimethylformamide (30 ml.), 3-(2-methyl-4-aminopyrimidin - 5-ylmethyl)-4-methyl-5-(2-chloroethyl)thiazolidine-2-thione (3.12 g.) is added, and the resultant mixture is stirred at room temperature for 11 hours. The reaction mixture is allowed to stand overnight at room temperature then evaporated under reduced pressure to remove the dimethylformamide. The residue is extracted with chloroform. The chloroform layer is washed with water, dried and the chloroform is evaporated to give 3-(2-methyl - 4 - aminopyrimidin-5-ylmethyl)-4-methyl-5-(2-methylthioethyl)thiazolidine-2-thione (2.8 g.) as crude crystals. This substance is recrystallized from acetone to give pure crystals melting at 166 to 167° C.

(b) To a suspension of 3-(2-methyl-4-aminopyrimidin-5 - ylmethyl) - 4 - methyl-5-(2-methylthioethyl)thiazolidine-2-thione (1.63 g.) in water (40 ml.), 30% aqueous hydrogen peroxide (1.9 g.) is added, and the resultant mixture is stirred under ice cooling for half an hour and then for 5 hours at room temperature. The reaction mixture is allowed to stand in an ice-box overnight. After confirming the absence of the ultra-violet absorption corresponding to the thiocarbonyl group (325 mµ) in the starting substance, the reaction mixture is combined with an aqueous saturated solution of barium chloride dihydrate (1.21 g.), and the precipitated barium sulfate is filtered off over active charcoal powder. The filtrate is concentrated under reduced pressure, and the residue is dissolved in ethanol and chilled in ice.

The precipitated crystals (1.41 g.) are collected by filtration and recrystallized from ethanol to give 3-(2-methyl - 4 - aminopyrimidin-5-ylmethyl)-4-methyl-5-(2-methylsulfinylethyl)thiazolium chloride hydrochloride hydrate as crystals melting at 189 to 191° C. (decomp.).

When the reaction mixture is treated with ammonium thiocyanate in lieu of barium chloride, 3-(2-methyl-4-amino - pyrimidin - 5 - ylmethyl)-4-methyl-5-(2-methylsulfinylethyl)thiazolium thiocyanate is obtained as crystals melting at 186 to 187° C. (decomp.).

When the reaction mixture is treated with sodium nitrate in lieu of barium chloride, 3-(2-methyl-4-aminopyrimidin - 5 - ylmethyl) - 4-methyl-5-(2-methylsulfinylethyl(thiazolium nitrate hydrate is obtained as crystals melting at 150 to 153° C. (decomp.).

EXAMPLE 2

To a suspension of 3-(2-methyl-4-aminopyrimidin-5-ylmethyl) - 4 - methyl - 5 - (2-methylthioethyl)thiazolidine-2-thione (1.63 g.), obtained similarly as in Example 1(a), in water (30 ml.), 30% aqueous hydrogen peroxide (1.15 g.) is added, and the resultant mixture is stirred at room temperature for 8 days. The reaction mixture is filtered to remove the unreacted raw material (0.75 g.). The filtrate is combined with an aqueous saturated solution of barium chloride and the precipitated barium sulfate is filtered off with active carbon powder. The aqueous layer is concentrated under reduced pressure, and the residue is mixed with ethanol and chilled in an ice-bath. The precipitated crystals are filtered off to give a mixture of 3-(2-methyl-4-aminopyrimidine-5-ylmethyl) - 4 - methyl - 5 - (2-methylthioethyl)thiazolium chloride hydrochloride monohydrate and 3-(2-methyl-4-aminopyrimidin - 5 - ylmethyl) - 4-methyl-5-(2-methylsulfinylethyl)thiazolium chloride hydrochloride melting at 165 to 210° C. (decomp.). Rf values on a paper chromatogram: 0.3 (2-methylthioethyl-thiazolium salt) and 0.5 (2-methylsulfinylethyl-thiazolium salt). Developing solvent: iso-Propanol/c-HCl/Water (170/41/39).

EXAMPLE 3

3 - (2 - methyl-4-aminopyrimidin-5-ylmethyl)-4-methyl - 5 - (2-methylthioethyl)thiazolidine-2-thione (1.63 g.), obtained as in Example 1(a), and water (5 ml.) are added to 12% aqueous hydrochloric acid (8.2 g.). The resultant solution is combined with an aqueous solution of potassium chlorate (0.8 g. in 10 ml.), and the resultant mixture is stirred at 40 to 45° C. for 3 hours. The reaction mixture is treated as above-mentioned to give a mixture of 3 - (2 - methyl- 4-aminopyrimidin-5-ylmethyl)-4-methyl-5-(2-methylthioethyl)thiazolium chloride hydrochloride and 3-(2-methyl-4-aminopyrimidin-5-ylmethyl)-4-methyl-5-(2-methylsulfinylethyl)thiazolium chloride hydrochloride. Rf values on a paper chromatogram: 0.36 (2-methylthioethyl-thiazolium salt) and 0.56 (2-methylsulfinylethyl-thiazolium salt). Developing solvent: iso-Propanol/c-HCl/Water (170/41/39).

EXAMPLE 4

(a) To a solution of phenyl sodium mercaptide prepared by dissolving phenyl mercaptan in a mixture of sodium hydroxide and dimethylformamide under cooling, 3 - (2 - methyl - 4 - aminopyrimidin-5-ylmethyl)-4-methyl - 5 - (2-chloroethyl)thiazolidine-2-thione is added under cooling. The resultant mixture is treated as above to give 3 - (2 - methyl - 4 - aminopyrimidin-5-ylmethyl)-4 - methyl - 5-(2-phenylthioethyl)thiazolidine-2-thione as crystals melting at 138 to 139° C. The yield is 85%.

(b) To a suspension of 3-(2-methyl-4-aminopyrimidin-5 - ylmethyl) - 4-methyl-5-(2-phenylthioethyl)thiazolidine-2-thione in water, 30% aqueous hydrogen peroxide (4.2 mole) is added, and the resultant mixture is treated as in Example 1(b) to give 3-(2-methyl-4-aminopyrimidin-5-ylmethyl) - 4 - methyl - 5-(2-phenylsulfinylethyl)thiazolium chloride hydrochloride as crystals melting at 198 to 200° C. (decomp.). The yield is 74%.

EXAMPLE 5

(a) To a solution of sodium ethyl mercaptide prepared by dissolving ethyl mercaptan (about 1.92 g.) in a mixture of sodium hydroxide (0.5 g.) and dimethylformamide (30 ml.) under cooling, 3-(2-methyl-4-aminopyrimidin - 5 - ylmethyl) - 4 - methyl-5-(2-chloroethyl)thiazolidine-2-thione (3.15 g.) is added under cooling, and the resultant mixture is stirred in an ice-bath for 3 hours. The mixture is then stirred at room temperature for 4 hours, allowed to stand overnight, and then evaporated under reduced pressure to remove the solvent. The residue is extracted with chloroform. The chloroform layer is washed with water, dried and evaporated to remove the chloroform. The residue is crystallized from ether to give 3 - (2 - methyl - 4 - aminopyrimidine-5-ylmethyl)-4 - methyl - 5 - (2-ethylthioethyl)-thiazolidine-2-thione (2.6 g.) as crude crystals. The substance is recrystallized from acetone to give pure crystals melting at 150 to 152° C.

(b) To a suspension of 3-(2-methyl-4-aminopyrimidin-5-ylmethyl)-4-methyl - 5 - (2-ethylthioethyl)thiazolidine-2-thione (1.7 g.) in water (30 ml.), 30% aqueous hydrogen peroxide (2.3 g.) is added, and the resultant mixture is stirred at room temperature for 4 hours. The reaction mixture is combined with a saturated solution of barium chloride dihydrate (1.21 g.), then filtered through active charcoal to remove the precipitated barium sulfate. The filtrate is evaporated under reduced pressure and the residue is crystallized from ethanol (20 ml.). The precipitated crystals are filtered off to give 3-(2-methyl-4-aminopyrimidin-5-ylmethyl) - 4 - methyl - 5-(2-ethylsulfinylethyl)thiazolium chloride hydrochloride (1.42 g.). The substance is recrystallized from ethanol to give pure crystals melting at 185 to 188° C. (decomp.).

EXAMPLE 6

As in Example 5, the reaction is carried out by using isopropyl mercaptan (2.3 g.) to give 3-(2-methyl-4-aminopyrimidin-5-ylmethyl) - 4 - methyl-5-(2-isopropylthioethyl)thiazolidine-2-thione as crystals melting at 127 to 129° C., and the said product is allowed to react with 30% aqueous hydrogen peroxide to give 3-(2-methyl-4-aminopyrimidin-5-ylmethyl) - 4 - methyl-5-(2-isopropylsulfinylethyl)thiazolium chloride hydrochloride as crystals melting at 201 to 202° C. (decomp.).

EXAMPLE 7

(a) 2-methyl-4-amino-5-bromomethylpyrimidine (5.7 g.) and 4-methyl-5-(2-methylthioethyl)thiazole (4.2 g.) are dissolved in dimethylformamide (5 ml.), and the resultant mixture is stirred at 110 to 115° C. for 10 minutes. After cooling, the reaction mixture is mixed with ethanol, chilled in ice and the precipitated crystals (1.9 g.) are collected by filtration. The substance is recrystallized from ethanol to give 3-(2-methyl-4-aminopyrimidin-5-ylmethyl)-4-methyl - 5 - (2-methylthioethyl)thiazolium bromide hydrobromide as crystals melting at 226 to 228° C. (decomp.). For the substance into the thiazolium chloride, the said substance (1 g.) is dissolved in water (3.5 ml.), combined with silver chloride (1.07 g.) and the resultant mixture stirred at 98 to 99° C. for 1 hour. The insoluble fraction is filtered off, and the filtrate is evaporated under reduced pressure to remove the water. The residue is crystallized from ethanol to give 3-(2-methyl-4-aminopyrimidin-5-ylmethyl) - 4 - methyl-5-(2-methylthioethyl)thiazolium chloride hydrochloride (0.65 g.). The substance is recrystallized from ethanol to give crystals melting at 215 to 217° C. (decomp.).

(b) To a solution of 3-(2-methyl-4-aminopyrimidin-5-ylmethyl)-4-methyl - 5 - (2-methylthioethyl)thiazolium chloride hydrochloride (1 g.) in water (10 ml.), 30% aqueous hydrogen peroxide (0.565 g.) is added, and the resultant mixture is stirred at room temperature for 3 hours. The reaction mixture is evaporated under reduced pressure to remove the water. The residue is combined with ethanol and chilled to give crystals. The crystals are filtered to give 3-(2-methyl-4-aminopyrimidin-5-ylmethyl-4-methyl-5-(2-methylsulfinylethyl)thiazolium chloride hydrochloride (0.7 g.). The substance is recrystallized from ethanol to give pure crystals melting at 189 to 191° C. (decomp.).

Preparation of the starting material (a) To a mixture of 4-methyl-5-(2-hydroxyethyl)thiazole (14 g.) and pyridine (9 g.), thionyl chloride (12.5 g.) is added under ice-cooling, and the resultant mixture is stirred at room temperature for 45 minutes. The reaction mixture is shaken thrice with chloroform and the combined chloroform layers are washed with water, dried and evaporated to remove the solvent. The residue is distilled under reduced pressure to give 4-methyl-5-(2-chloroethyl)thiazole (6.2 g.) as an oil boiling at 96 to 98° C./6 mm. Hg.

(b) To a mixture of powdered sodium hyroxide (1.5 g.) and dimethylformamide (60 ml.), methyl mercaptan (4 g.) is added under ice-cooling to give sodium methyl mercaptide. To this mixture 4-methyl-5-(2-chloroethyl) thiazole (5 g.) is added, and the resultant mixture is stirred under ice-cooling for an hour, then stirred with water cooling for 6 hours and allowed to stand overnight. The reaction mixture is evaporated to remove the remaining solvent. The residue is shaken with chloroform, and the chloroform layer is washed with water, dried and evaporated to remove the chloroform. The residue is distilled under reduced pressure to give 4-methyl-5-(2-methylthioethyl)thiazole (4.4 g.) as an oil boiling at 120 to 121° C./7 mm. Hg.

EXAMPLE 8

(a) To a solution of benzyl sodium mercaptide prepared by dissolving benzyl mercaptan in a mixture of sodium hydroxide and dimethylformamide, 3-(2-methyl-4-aminopyrimidin - 5 - ylmethyl) - 4-methyl-5-(2-chloroethyl)thiazolidine-2-thione is added under cooling. The resultant mixture is treated as in Example 1(a) to give 3-(2-methyl - 4 - aminopyrimidin - 5-ylmethyl)-4-methyl-5 - (2 - benzylthioethyl)thiazolidine-2-thione as crystals melting at 134 to 135° C. The yield is 86%.

(b) To a suspension of 3-(2-methyl-4-aminopyrimidin-5-ylmethyl) - 4 - methyl - 5 - (2-benzylthioethyl)thiazolidine-2-thione in water, 30% aqueous hydrogen peroxide (4.1 mole) is added, and the resultant mixture is treated as in Example 1(b) to give 3 - (2 - methyl - 4 - aminopyrimidin - 5 - ylmethyl) - 4 - methyl - 5 - (2 - benzylsulfinylethyl)thiazolium chloride hydrochloride as crystals melting at 202 to 204° C. (decomp.). The yield is 75.5%.

EXAMPLE 9

3 - (2 - methyl - 4 - aminopyrimidin - 5 - ylmethyl)-4-methyl - 5 - (2 - methylsulfinylethyl)thiazolium chloride hydrochloride is admixed with nine times its weight of lactose. The powder is dissolved in 1000 to 2000 volumes of water before use.

EXAMPLE 10

3 - (2 - methyl - 4 - aminopyrimidin - 5 - ylmethyl)-4-methyl - 5 - (2 - methylthioethyl)thiazolium chloride hydrochloride (25 parts by weight) is admixed with wheat powder (75 parts by weight) to give a homogeneous mix. The mix is diluted 50 to 1000 fold with chicken feed before use.

EXAMPLE 11

3 - (2 - methyl - 4 - aminopyrimidin - 5 - ylmethyl)-4-methyl - 5 - (2 - methylsulfinylethyl)thiazolium chloride hydrochloride (10 parts by weight) is admixed with rice bran (90 parts by weight) to give a homogeneous mix. The mix is diluted with chicken feed before use to give a 0.008 to 0.015% concentration of the effective ingredient.

EXAMPLE 12

3 - (2 - methyl - 4 - aminopyrimidin - 5 - ylmethyl)-4-methyl - 5 - (2 - methylsulfinylethyl)thiazolium chloride hydrochloride (45 parts by weight), sucrose (12 parts by weight), starch (15 parts by weight), talc (25 parts by weight), magnesium stearate (2 parts by weight) and stearic acid (1 part by weight) are used in a conventional manner for the preparation of tablets.

What is claimed is:
1. A thiazolium salt represented by the formula

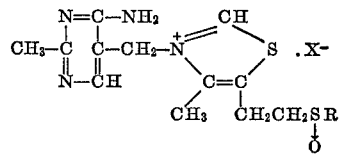

wherein R represents methyl, ethyl, isopropyl phenyl, tolyl, benzyl or phenylethyl and X represents an anion of an acid selected from the group consisting of hydrochloric, sulfuric, nitric, thiocyanic, phosphoric, succinic, naphthalenedisulfonic, benzoic, benzenesulfonic or acetic acid or their pharmaceutically-acceptable acid-addition salt.

References Cited

UNITED STATES PATENTS 3,268,403  8/1966  Rogers et al. _____ 200—256.5

ALEX MAZEL, Primary Examiner

R. J. GALLAGHER, Assistant Examiner

U.S. Cl. X.R.

260—256.4 N, 256.6, 302 R; 424—255